Aug. 20, 1957     H. POSNER ET AL     2,803,036
NATURAL ANIMAL CASING FORM
Filed Jan. 3, 1955
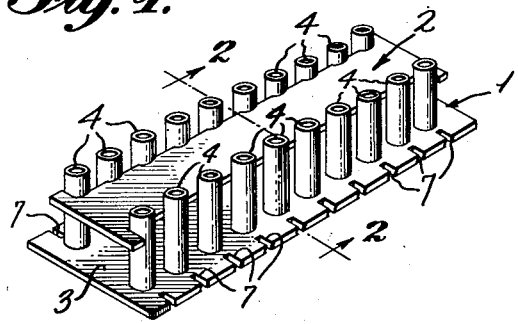
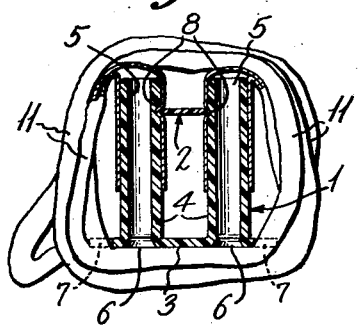
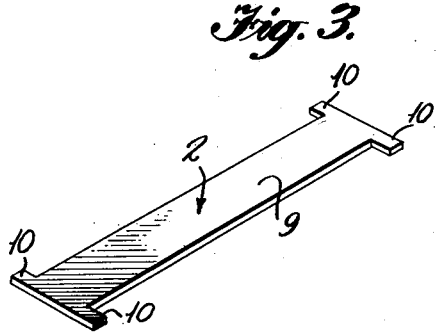
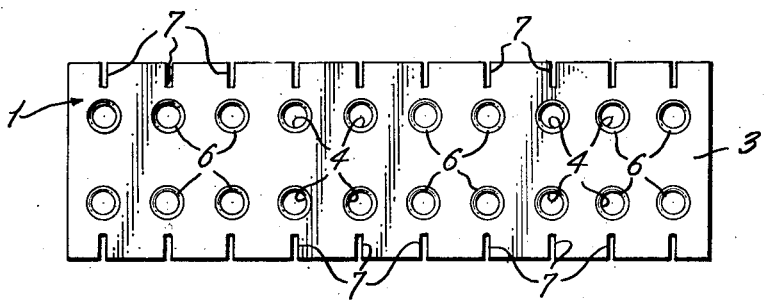
INVENTORS
HARRY POSNER AND
J. R. POSNER
BY
Mason, Fenwick & Lawrence
ATTORNEYS

2,803,036
NATURAL ANIMAL CASING FORM

Harry Posner and Jack R. Posner, Cumming, Ga.

Application January 3, 1955, Serial No. 479,542

3 Claims. (Cl. 17—43)

This invention relates to casing handling forms, and more particularly to forms to which natural animal casings used in the making of sausage, can be attached for handling, packing, shipping and flushing.

Natural animal casings, usually from hogs, are used extensively in the making of sausage products. The casings, which are some thirty feet long, are thoroughly cleaned, folded and a number secured together in a bundle for packing in barrels. The barrels are shipped from the slaughter house to the packing house, where the bundles must be opened and the casings straightened out and flushed before using. Frequently, the casings are badly tangled, and much time is lost in straightening them. Individual flushing of the casings is a time consuming task.

The primary object of the present invention is to provide a form which may be made at low cost, so that it may be disposed of after a single use, if desired, to which casings may be attached at the slaughter house and remain attached during subsequent handling, packing, shipping and flushing.

Another object is to provide such a device which will prevent the entanglement of a single casing or of the casings with one another.

A still further object is to provide a form which will be a carrier for the casings and will enable an operator to flush a plurality of casings simultaneously.

Other objects of the invention will become apparent from the following description of one practical embodiment thereof, when taken in conjunction with the drawings which accompany, and form part of, this specification.

In the drawings:

Figure 1 is a perspective view of a casing form embodying the principles of the present invention;

Figure 2 is an enlarged vertical, transverse section through the form with a casing in place, and is taken on the line 2—2 of Figure 1;

Figure 3 is a perspective view of a locking member which forms part of the form; and Figure 4 is a bottom plan view of the form.

Referring to the drawings in detail, there is shown a form for handling natural animal casings which consists of two members, a casing support 1 and a locking bar 2.

The support has a flat base 3, which has two spaced, parallel rows of hollow casing-receiving pegs 4 projecting upwardly therefrom. The pegs are all of the same height and cylindrical. The support is shown as being of molded-plastic, with the base and pegs integral. Any number of pegs may be provided, but there will be an equal number in each row with opposed pegs in the two rows forming pairs. As mentioned, the pegs are hollow, as shown at 5, and open through the base. The base openings 6 are tapered, providing a wide mouth for the admission of water when the form is inverted for flushing as will be described. The side edges of the base are provided with notches 7, equal in number to the pegs and lying in transverse alignment with the pairs of pegs.

The pegs have horizontal notches 8 on their inner sides, spaced from their tops. In other words, each peg has a notch 8 on its side facing the opposite row of pegs, and all of the notches are in horizontal alignment. The notches 8 are to receive the locking bar 2.

Locking bar 2 is a substantially I-shaped member, having an elongated central portion 9 to lie between the rows of pegs with its side edges seated in the notches 8 of the pegs, and transversely extending end members 10 which project beyond the side edges of the central portion to engage the sides of the end pegs to prevent longitudinal movement. The locking bar is also of plastic or similar material.

When the device is to be used, the open ends of the animal casings 11 are slipped over the pegs 4 as shown in Figure 2. One end of a casing is put on each peg of the two rows. When all of the pegs have been filled, the locking bar is pushed down between the peg rows until its side edges seat in the notches 8 in the pegs. The base of thin material will flex sufficiently to permit the pegs to spread as the locking bar is pressed downwardly. The locking bar will press the casings into the notches in the pegs and lock the casings against dislodgment. The balance of the casing is wound about the holder, as illustrated in Figure 2, and the free end is slipped into the notch 7 adjacent the peg to which the casing is attached.

This arrangement makes a convenient package for handling and transporting the casings. Each casing occupies its own particular place, free from entanglement with the other casings. Each end of each casing is fixed so that there is no likelihood of the casings unwinding. When the package is received at the packing house, the casings can be unwound, leaving their ends attached to the pegs. If the holder is inverted and water flowed over it, water will flow into the base openings 6, through the hollow pegs 4 into the casings attached thereto to flush the casings. Thus, the casings can be handled, shipped and flushed while attached to the holder, and each casing will remain untangled. This greatly facilitates the handling of the casings by the packer.

While in the above one practical embodiment of the invention has been disclosed, it will be apparent that the specific structural details shown and described are for purposes of illustration, and the invention may take other forms within the scope of the appended claims.

What is claimed is:

1. A form for holding natural animal casings for packing, transporting and flushing comprising, an elongated base having some transverse flexibility, vertical pegs having axial openings therethrough arranged in two longitudinally extending parallel spaced rows on said base, said base having openings therethrough in alignment with openings in said pegs affording communication to the interior of casings on said pegs from the bottom of said base, each of the pegs having a recess in its face confronting the opposite peg row with all of said recesses being horizontally aligned parallel to said base and spaced therefrom, a locking bar the length of the peg rows and of greater width than the spacing between peg rows adapted to snap into seating engagement in said recesses upon transverse flexing of said base to lock casing ends upon the pegs and to form with said base a reel about which the free ends of the casings may be wound.

2. In a form for holding natural animal casings for packing, transporting and flushing as claimed in claim 1, said locking bar having transverse projections at its ends to engage the end pegs of the peg rows to prevent endwise movement of the locking bar.

3. In a form for holding natural animal casings for packing, transporting and flushing as claimed in claim 1, said locking bar having transverse projections at its ends to engage the end pegs of the peg rows to prevent endwise movement of the locking bar and said base having notches in its edges adjacent the pegs to receive the free ends of casings wrapped around said form.

References Cited in the file of this patent

UNITED STATES PATENTS

| | | |
|---|---|---|
| 486,640 | Gingras | Nov. 22, 1892 |
| 2,074,140 | Bates | Mar. 16, 1937 |
| 2,244,591 | Youngs et al. | June 3, 1941 |
| 2,370,945 | Fields | Mar. 6, 1945 |

FOREIGN PATENTS

| | | |
|---|---|---|
| 897,491 | Germany | Nov. 23, 1953 |